No. 740,748. PATENTED OCT. 6, 1903.
U. A. FITZ MAURICE.
SEED PLANTING MACHINE.
APPLICATION FILED JUNE 11, 1900.
NO MODEL. 3 SHEETS—SHEET 1.
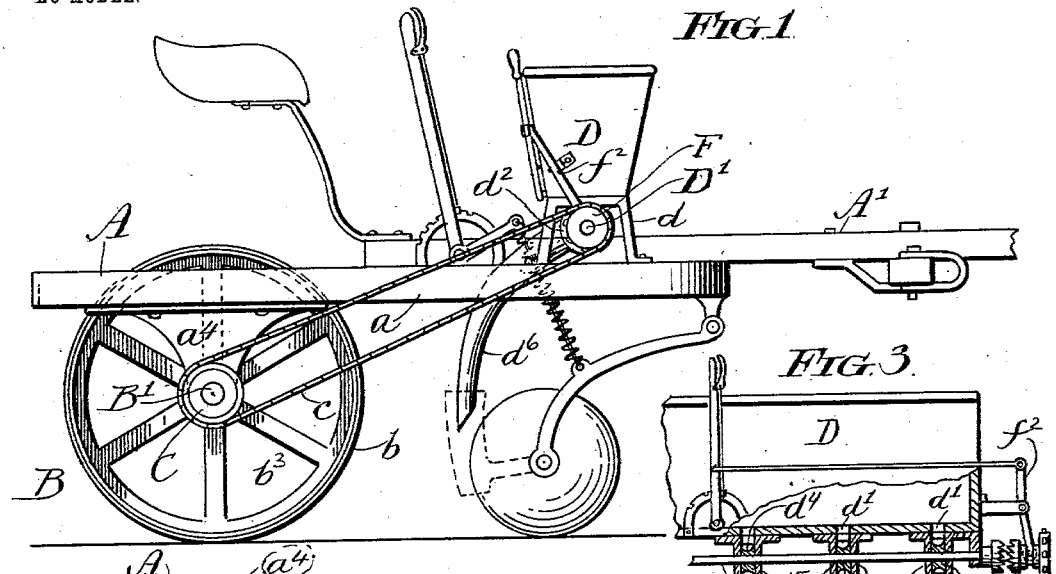
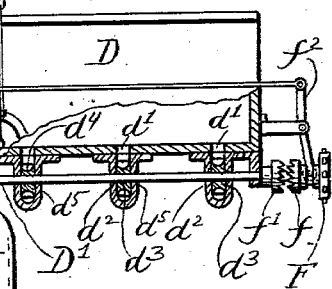
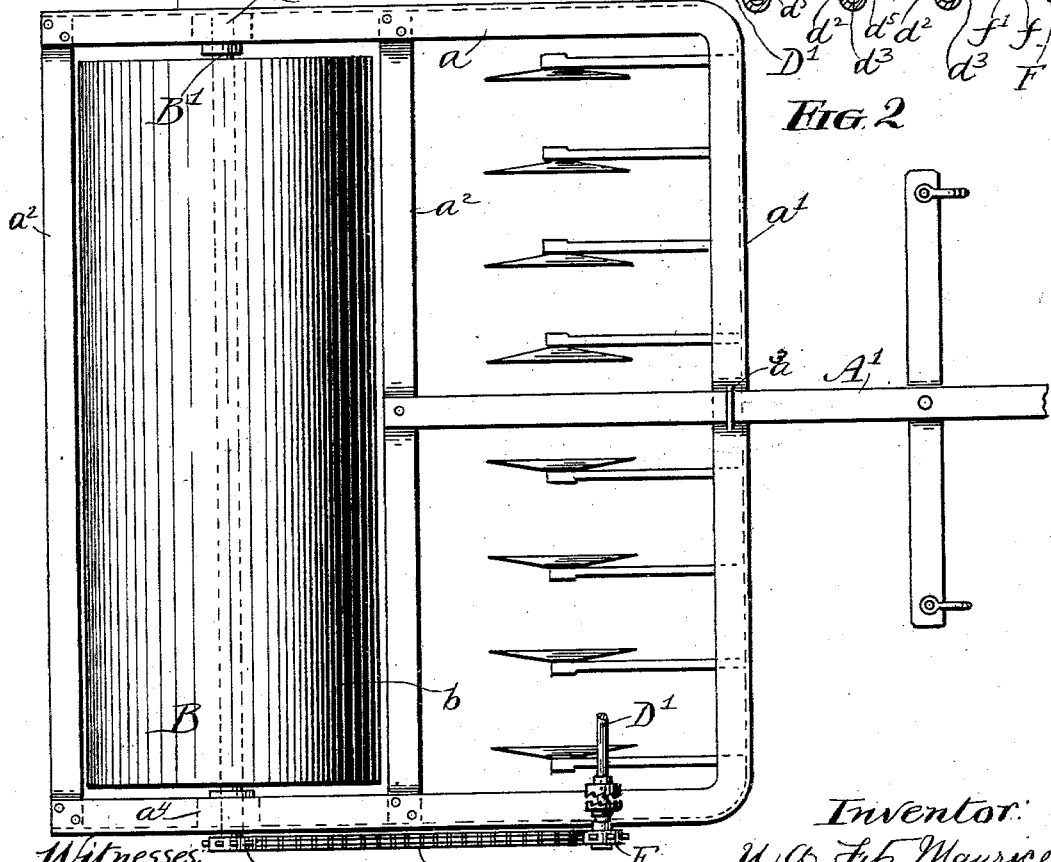

No. 740,748. PATENTED OCT. 6, 1903.
U. A. FITZ MAURICE.
SEED PLANTING MACHINE.
APPLICATION FILED JUNE 11, 1900.
NO MODEL. 3 SHEETS—SHEET 2.
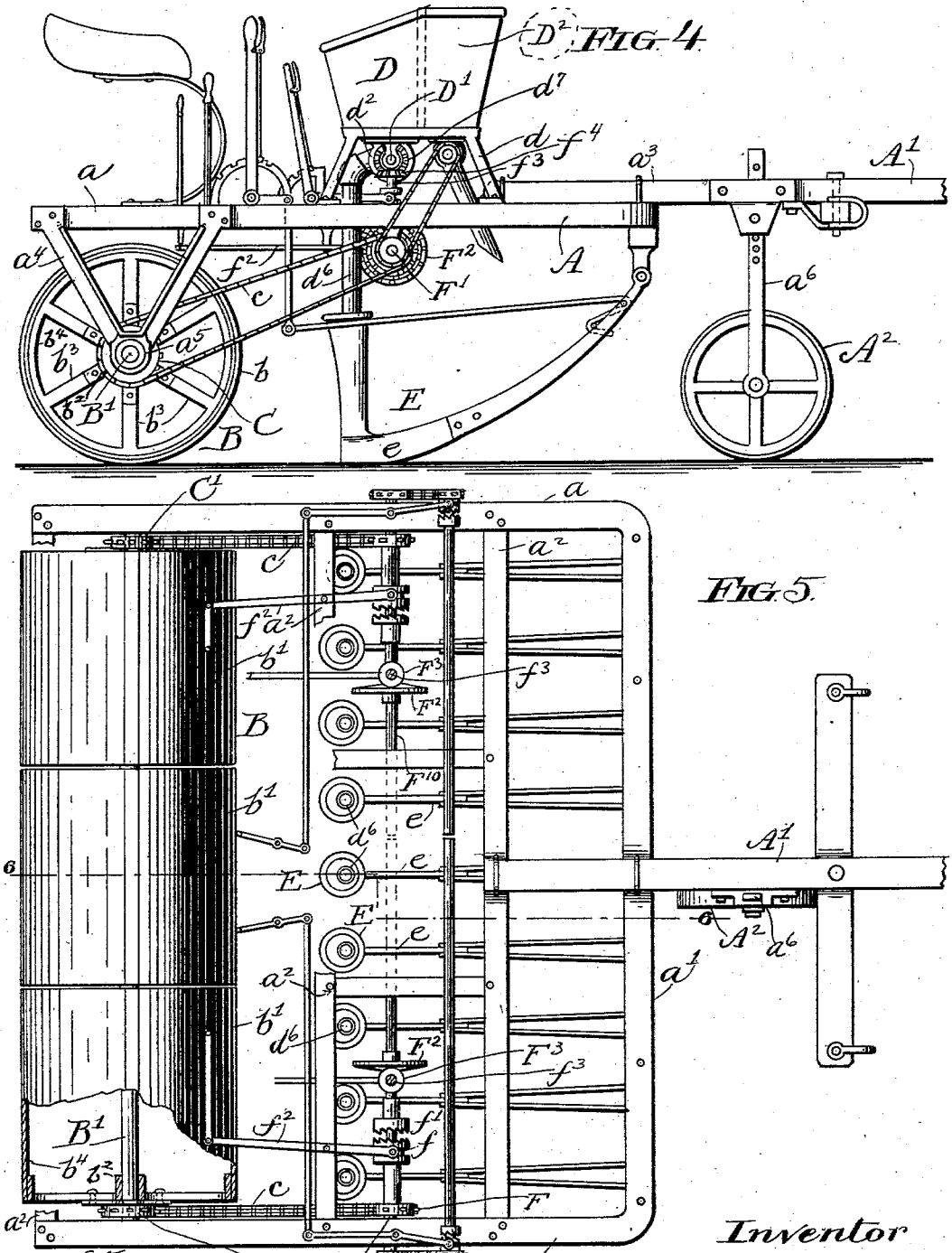

No. 740,748. PATENTED OCT. 6, 1903.
U. A. FITZ MAURICE.
SEED PLANTING MACHINE.
APPLICATION FILED JUNE 11, 1900.
NO MODEL. 3 SHEETS—SHEET 3.
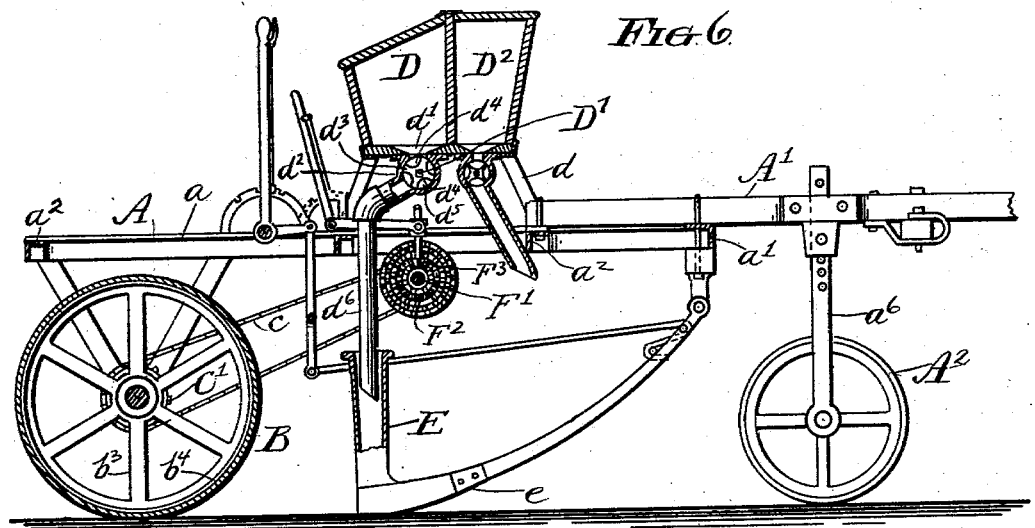
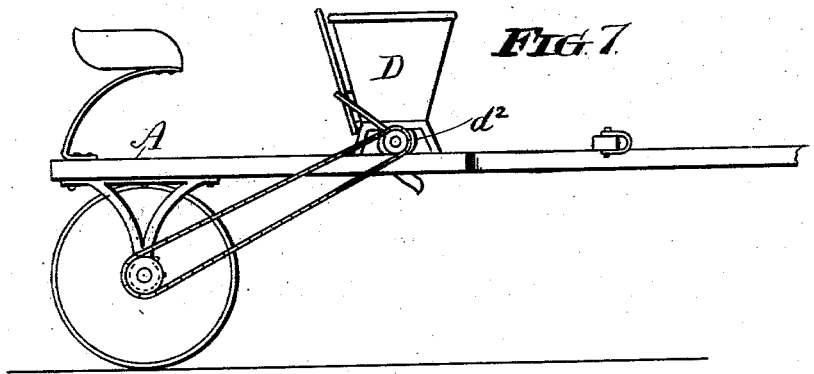
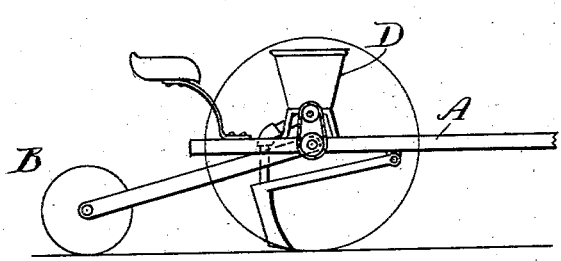
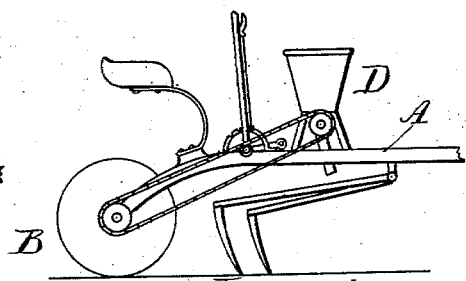

No. 740,748. Patented October 6, 1903.

UNITED STATES PATENT OFFICE.

ULYSSES A. FITZ MAURICE, OF CHICAGO, ILLINOIS.

SEED-PLANTING MACHINE.

SPECIFICATION forming part of Letters Patent No. 740,748, dated October 6, 1903.

Application filed June 11, 1900. Serial No. 19,841. (No model.)

*To all whom it may concern:*

Be it known that I, ULYSSES A. FITZ MAURICE, of Chicago, in the county of Cook and State of Illinois, have invented certain new and useful Improvements in Seed-Planting Machines, of which the following is a specification.

This invention relates to combined rollers and seed-planters; and it consists in the construction and combination of parts hereinafter more particularly set forth and claimed.

In the drawings, Figure 1 is a side view of a machine containing features of my invention. Fig. 2 is a plan view of same with seed-box and some of the parts removed. Fig. 3 is a sectional view of seedbox and feed-wheels. Fig. 4 is a side view of a seeding-machine embodying additional features and modifications. Fig. 5 is a plan view of same with seedbox and some of the parts removed. Fig. 6 is a vertical longitudinal sectional view of Fig. 5, taken on the line 6 6 of said figure; and Figs. 7, 8, and 9 are side elevations of modified forms of seeding-machine, the views being partly diagrammatic.

A refers as a whole to the framework of machine for supporting seed-receptacle, gears, and other appurtenances. This framework has side members $a$, an end piece $a'$, and rear cross-pieces $a^2$. The frame is preferably made of iron or steel with the side members and front end piece made from one piece of metal of angle shape in cross-section, forming a horizontal U-shape frame, to which the other parts of frame are riveted or bolted.

A' is the tongue, which is secured to frame A at $a^3$.

Attached to the side members $a$, at rear of same, are two pendent brackets $a^4$, having journals or bearings $a^5$ for the shaft of the rolling device.

B refers as a whole to the rolling device. This is for the purpose of following in the wake of seed-discharging device and of covering, rolling, or leveling in one operation a width of field equivalent to that effected by the machine in the distribution or discharge of seed.

B' is the axle of the rolling device, the said axle being mounted in the journals $a^5$ at sides of frame.

The rolling device consists of a roller or cylinder $b$, which extends across between the sides of frame. This roller may consist of one cylinder, or in some instances it is preferably made in sections, as shown at $b'$ $b'$, Fig. 5. The roller may be made of metal or wood and in any suitable manner. The roller is provided with hubs $b^2$, which are mounted on the axle or shaft B', $b^3$ being arms or spokes extending from the hubs to sides $b^4$ of roller. When a sectional roller is employed, the hubs are mounted to turn freely on shaft B', so as to permit the sections to turn independently of each other.

A small drive-wheel C is connected to the rolling device B. When the roller is fixed on the axle, the wheel C is mounted on axle, but when the roller consists of separable sections $b'$, placed loosely on shaft, the drive-wheel is secured to hub or spokes of one of the sections, as shown in Fig. 5, and two drive-wheels, one at each end of the roller, are employed when it is desired to operate the feed devices, so that about one-half of them may be thrown in or out of gear when desired.

D is the seed-receptacle, mounted on small supporting-brackets $d$, attached to frame A. The receptacle may be constructed in any well-known manner and, as shown, is provided with a plurality of openings $d'$ and discharge or feed-ejecting devices $d^2$, having means for distributing or depositing the seed with some regularity. These means may be varied according to the purposes or adaptability of the seeder. As shown in the principal views, in which the machine is intended for seeding grains, each seed-cup $d^5$ is provided with a small feed-wheel $d^3$, having seed-cavities $d^4$. D' is a shaft on which the feed-wheels are mounted. Conducting-tubes $d^6$ for the seed lead from the feeding devices to the earth or furrow.

When means are employed for furrowing or breaking the ground—for instance, as shown in Fig. 4, where drills E, having shoes $e$, are employed—the tubes $d^6$ conduct the grains into the drills; but I do not wish to limit my invention to the particular means there shown, other means for furrowing or breaking ground—such as disks, hoes, and cultivators—being shown in Figs. 1, 8, and 9, respectively, Fig. 7 showing the machine simply for distributing seed broadcast and rolling same.

Various means or gearing may be employed for operating the seed-feeding devices. The preferable construction is as follows:

F is a sprocket-wheel provided with a toothed clutch device $f$, mounted loosely on a shaft F', as shown in Figs. 4 and 5.

$f^2$ is a lever for moving clutch in or out of gear, suitable connections being employed for moving same by driver without leaving his seat.

$f'$ is a toothed part fixed on the shaft F' and adapted to be engaged by the part $f$. The shaft F' is provided with a graduated disk-wheel $F^2$.

$F^3$ is an adjustable wheel mounted on a shaft $f^3$, carrying a gear-wheel $f^4$, engaging a wheel $d^7$ on the shaft D'. The drive-wheel C on axle B' is connected to the wheel F by a chain $c$. As shown in Fig. 5, about one half of the feed devices are operated by the wheel C and the other half by the wheel C', gearing such as described above being employed for operating opposite half of the feed-wheels.

Briefly, the operation of the machine as now described, and shown in Figs. 4, 5, and 6, is as follows: The seed-receptacle is filled with grain or any desirable seed, and the machine is driven over a field that is plowed or in a condition for seeding. By placing the clutches $f f'$ in connective operation the rotation of the roller B will cause the drive-wheels C C', through the intervening gears, to actuate the seed-feeding devices and expel and deposit the seed in the soil, the shoes $e$ having first made furrows into which the seed falls. The roller B then levels, presses, and covers seed. A supplementary seed-receptacle $D^2$, as shown in Fig. 4, may be employed for grass-seed when desired and operated by suitable mechanism. In constructing this roller B it is made somewhat lighter than those used heretofore, the seeding apparatus supplying the necessary additional weight. A wheel $A^2$, journaled in the lower end of an adjustable standard $a^6$, may be employed, as shown in Fig. 4, to some advantage, and thus take the weight of forward part of machine off the horses.

Certain features of the machine may be modified without departing from the spirit of my invention. In Fig. 1 I have shown the drive-wheel C directly connected to a wheel on the shaft of feed devices $d^3$.

It will thus be seen that my invention provides a comparatively simple and effective appliance for seeding or planting grain and of rolling same and for analogous purposes. It has a particular advantage in that the horses never trample on the seed sown, which would occur if the rolling was performed by a separate implement. The combined seeder and roller may also be readily used on unplowed ground suitable for seeding, as the roller will crush and level any remaining stalks or stubble.

What I claim is—

In combination with a roller and a seed-receptacle, a series of seed-wheels operating under the latter on a shaft D', another shaft F', a gear-wheel and clutch carried by the latter shaft, endless gearing from said gear-wheel to a wheel on shaft D', gearing from said roller to said gear-wheel and means for shifting the said clutch substantially as set forth.

In testimony whereof I have hereunto set my signature this 2d day of June, 1900.

ULYSSES A. FITZ MAURICE.

In presence of—
J. B. HALPENNY,
B. M. SAUNDERS.